(12) United States Patent
Pluder et al.

(10) Patent No.: US 12,536,320 B2
(45) Date of Patent: Jan. 27, 2026

(54) PURPOSE-BASED DATA MANAGEMENT FOR COMPUTING SYSTEMS

(71) Applicant: SAP SE, Walldorf (DE)

(72) Inventors: Carsten Pluder, Spiesen-Elversberg (DE); Diane Schmidt, Walldorf (DE); Volker Lehnert, Schriesheim (DE); Martina Knoedler, Bad Wimpfen (DE); Thorsten Bruckmeier, Walldorf (DE); Philipp Alexander Zikesch, Heidelberg (DE); Bernhard Drittler, Walldorf (DE); Matthias Vogel, Saarbruecken (DE); Katrin Ludwig, Walldorf (DE); Naved Ahmed, Sülzetal (IN); Saritha Palli, Bangalore (IN); Shweta Sureshchandra Gupta, Bangalore (IN); Arun Kumar Gowd, Bangalore (IN); Dev Karan Ahuja, Bengaluru (IN); Shwetha H S, Bengaluru (IN)

(73) Assignee: SAP SE, Walldorf (DE)

(*) Notice: Subject to any disclaimer, the term of this patent is extended or adjusted under 35 U.S.C. 154(b) by 197 days.

(21) Appl. No.: 17/867,642

(22) Filed: Jul. 18, 2022

(65) Prior Publication Data

US 2023/0385449 A1 Nov. 30, 2023

(30) Foreign Application Priority Data

May 27, 2022 (IN) .............................. 202241030408

(51) Int. Cl.
*G06F 21/62* (2013.01)
*G06F 21/78* (2013.01)

(52) U.S. Cl.
CPC ...... *G06F 21/6245* (2013.01); *G06F 21/6209* (2013.01); *G06F 21/78* (2013.01)

(58) Field of Classification Search
CPC .... G06F 21/10; G06F 21/604; G06F 21/6209; G06F 21/6218; G06F 21/6245–6254; G06F 21/78; G06F 21/88; G06F 2221/2143
See application file for complete search history.

(56) References Cited

U.S. PATENT DOCUMENTS

| | | | |
|---|---|---|---|
| 8,527,468 B1 | 9/2013 | Crafford et al. | |
| 2007/0282843 A1* | 12/2007 | Beck | H04L 63/10 707/999.009 |
| 2013/0238563 A1 | 9/2013 | Amarendran et al. | |
| 2014/0032600 A1 | 1/2014 | Sarferaz et al. | |
| 2015/0248419 A1 | 9/2015 | Motoyoama | |

(Continued)

*Primary Examiner* — Kevin Bechtel
(74) *Attorney, Agent, or Firm* — Klarquist Sparkman, LLP

(57) ABSTRACT

Systems and processes for managing access to personal data based on a purpose for storing the personal data are provided. In a method for managing personal data access, personal data for a data subject corresponding to a first data category is received, and an operation is executed in a purpose agent to associate one or more purposes to the personal data, where the one or more purposes are assigned to the first data category and include at least a first purpose. The personal data may be stored in a data storage system, and the stored personal data may be designated as being associated with the one or more purposes. Access to the personal data may be controlled based on the one or more purposes.

12 Claims, 7 Drawing Sheets

(56) References Cited

U.S. PATENT DOCUMENTS

| | | |
|---|---|---|
| 2018/0052874 A1 | 2/2018 | Huang |
| 2022/0382713 A1 | 12/2022 | Shadiq et al. |
| 2023/0112332 A1 | 4/2023 | Brenner et al. |
| 2023/0133938 A1 | 5/2023 | Knotts |
| 2023/0161900 A1* | 5/2023 | Boutros ................ G06F 3/0482 726/27 |
| 2023/0185938 A1 | 6/2023 | Schmidt et al. |
| 2024/0419816 A1* | 12/2024 | Karr ........................ G06F 21/78 |

* cited by examiner

PURPOSE-BASED DATA MANAGEMENT FOR COMPUTING SYSTEMS

CROSS-REFERENCE TO RELATED APPLICATION

This application claims the benefit of Indian Provisional Patent Application No. 202241030408 filed on May 27, 2022, the entirety of which is hereby incorporated by reference.

BACKGROUND

Organizations that collect personal data from individuals are typically subject to regulations or rules regarding protection and accessibility to the data. For example, the General Data Protection Regulation (GDPR) includes provisions and requirements for data controllers (e.g., the natural or legal person, public authority, agency, or other body which, alone or jointly with others, determines the purposes and means of the processing of personal data, as defined in Article 4 of the GDPR). The provisions and requirements of the GDPR include protecting the rights of data subjects that correspond to collected personal data (e.g., by following principals in Articles 5 and 25 of the GDPR, which may include pseudonymization of the data, implementing measures for ensuring that only personal data necessary for each specific purpose of processing are processed, and/or other practices) and providing personal data of a particular individual to that individual if requested (e.g., in accordance with the provisions in Articles 12 and 15 of the GDPR, which includes the provision that the controller shall take appropriate measures to provide information and communication relating to processing to the data subject in a concise, transparent, intelligible, and easily accessible form). As the personal data managed by a data controller may be distributed in many different areas of one or more databases, it may be difficult to efficiently manage personal data in accordance with purposes for collecting and processing the personal data, while maintaining security and privacy of other data collected by the data controller. Accordingly, there remains a need for improved technologies to manage personal data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the detailed description is directed to various innovative technologies for managing, processing, and generating display information relating to data input into cartesian columns. In some examples, the disclosed technologies can be implemented as computer-readable media storing instructions which, when executed by one or more hardware processors, cause the hardware processors to perform the following actions. Personal data for a data subject is received, and a respective data category for each type of data represented in the received personal data is identified, including identifying that a first subset of the personal data is associated with a first data category. An operation is executed in a purpose agent to associate one or more purposes to the personal data in accordance with the identified respective data categories, wherein the first subset of the personal data is associated with a first purpose assigned to the first data category. The personal data is stored in a data storage system, and access to the personal data is controlled based on the one or more purposes associated with the identified respective data categories, wherein access to the first subset of the personal data is controlled based on the first purpose.

In some examples, the disclosed technologies can be implemented as a method performed by a computer. Personal data for a data subject corresponding to a first data category is received, and an operation is executed in a purpose agent to associate one or more purposes to the personal data, wherein the one or more purposes are assigned to the first data category and include at least a first purpose. The personal data is stored in a data storage system, wherein the stored personal data is designated as being associated with the one or more purposes. Access to the personal data is controlled based on the one or more purposes, wherein the method further includes, in a first condition, where the personal data is associated with two or more purposes, revoking access to the personal data in accordance with the first purpose once the first purpose is fulfilled or a retention time threshold associated with the first purpose has elapsed, and in a second condition, where the personal data is associated with the first purpose, deleting the personal data once the first purpose is fulfilled or the retention time threshold has elapsed.

In some examples, the disclosed technologies can be implemented in a system including one or more hardware processors with coupled memory, and computer-readable media storing instructions executable by the one or more hardware processors. The instructions include first, second, third, and fourth instructions. The first instructions, when executed, cause personal data associated with a data subject to be received. The second instructions, when executed, cause a first purpose to be assigned to the personal data based on a determination that the personal data is associated with a first data category, the first purpose being assigned to the first data category. The third instructions, when executed, cause the personal data to be stored at a data controller storage device in association with a designation of the first purpose. The fourth instructions, when executed, cause access to the personal data and storage of the personal data in the data controller storage device to be controlled based on the first purpose.

The foregoing and other objects, features, and advantages of the invention will become more apparent from the following detailed description, which proceeds with reference to the accompanying figures.

DETAILED DESCRIPTION

Introduction and Overview

As described above, organizations may provide mechanisms for storing and processing personal data for data subjects. In some cases, legal requirements and personal preferences are established which define storage periods and purposes for which personal data should be stored and processed. However, current data storage techniques may not provide any mechanism to store data and manage access based on purpose, or may experience difficulty managing purpose designations for personal data, especially data that is associated with multiple purposes and/or processed/stored by multiple entities. Additionally, other data storage techniques may not provide any way for data subjects to review access to their personal data based on the purpose for which the personal data is being processed.

This disclosure describes a new approach to provide purpose-based storage and processing of personal data. The disclosed technologies enable organizations to comply with rules and regulations (e.g., GDPR rules) regarding the management of personal data, including increasing a transparency of data processing and improving system integration. For example, in accordance with the disclosed technologies, new purpose and data categories are provided for a technical persistence in a data management system, and a data controller configuration may be integrated into associated data models. The disclosed technologies may provide configurations and rule framework to support automatic determinations for purpose designations and assign those to corresponding data categories and data controllers. Purpose validity and data controller assignments may be terminated after a respective purpose and corresponding retention period ends.

Example System

Figure 1:
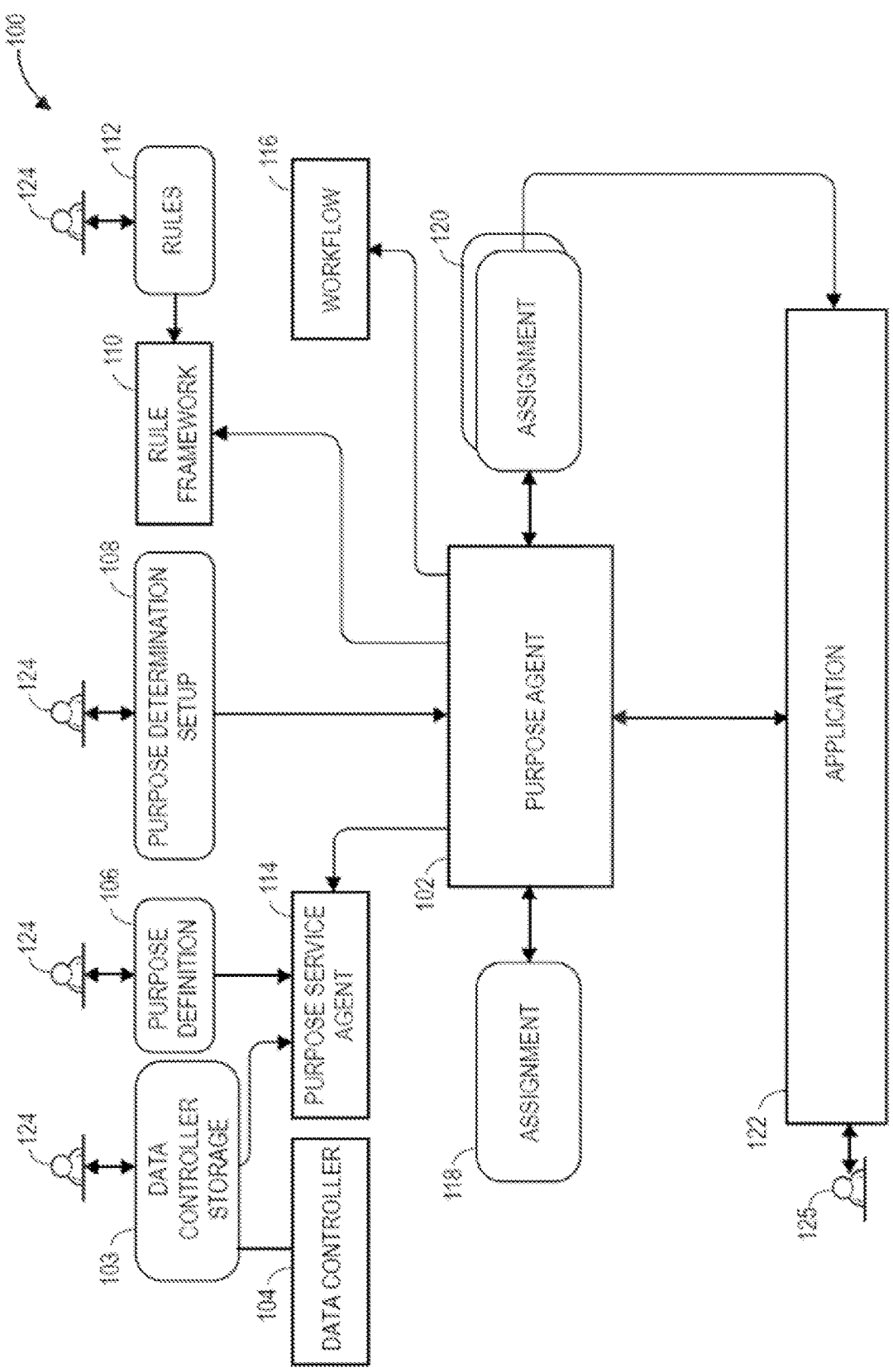
FIG. 1 is a block diagram of an example system for purpose-based management of personal data in accordance with examples of the present disclosure.

FIG. 1 shows an example block diagram of a system 100 for managing purpose assignments for personal data in accordance with examples of the present disclosure. In some examples, a purpose agent 102 may be included for assigning a purpose to a set of data belonging to a data subject. For example, the set of data may be stored in a data controller storage 103, which may be used for storing data associated with a data controller 104. The data controller storage 103 may include one or more data storage devices. The one or more storage devices of the data controller storage 103 may be included in a single computing system or server and/or distributed (e.g., in a cloud-based environment) amongst multiple computing systems. The data controller 104 may include an organization or other entity which collects data from a data subject. In some examples, the data controller 104 may be associated with a processor that processes data from the data subject. Further, in some examples, the data controller 104 may be associated with, for example, a cloud-based service provider. Accordingly, in some examples, the data controller 104 may manage access to data of the data subject across a cloud-based service platform.

The system 100 may include a purpose definition 106, which may include one or more definitions defining one or more respective purposes. For example, a purpose determination setup agent 108 may manage purpose determination of the purpose agent 102. A rule framework agent 110 may manage a rule framework associated with the purpose agent 102. For example, the rule framework agent 110 may include a plurality of rule definitions corresponding to one or more rules 112. In some examples, a variety of different purposes may be defined, including purposes relating to legal parameters or requirements and purposes related to consent of the data subject. Further, in some embodiments, additional user-defined purposes may be defined for use by the purpose agent 102.

In some examples, a purpose service agent 114 may be communicatively coupled to the data controller storage 103 and the purpose definition 106 such that the purpose service agent 114 is able to access and retrieve the data controller storage 103 and the purpose definition 106. Further, the purpose service agent 114 may interface with the purpose agent 102 to manage one or more purpose service requests. Additionally, a workflow 116 may be associated with the purpose agent 102. In some examples, the purpose agent 102 uses the workflow 116 to identify a document or other data such that the purpose agent 102 can assign a purpose to the document or other data. In some examples, the purpose agent 102 provides an assignment 118 to a newly identified purpose assigned to a set of master data. The assignment may include a purpose assigned to a set of data. Further, in some examples, the purpose agent 102 may provide one or more other assignments 120 related to subsequent sets of data. In some examples, the identified purpose assignments for the newly identified document or other data may be stored to control the processing and storage of the document/data.

In some examples, the purpose agent 102 is communicatively coupled to an application 122. The application 122 may include an application running on a user device in which the purposes of the purpose agent are implemented. For example, the assignments 120 may be provided to the application 122, as shown, and workflow 116 may be executed at least partially within the application 122. Additionally, in some examples, one or more users 124 may interact with various components of the system 100, as shown. For example, a first user (e.g., a data controller administrator) may operate the data controller storage 103 or data controller 104, a second user (e.g., a purpose definition administrator) may provide the purpose definition 106, a third user (e.g., a purpose determination or purpose administrator) may operate the purpose determination setup agent 108, and a fourth user (e.g., a rules administrator) may provide the rules 112. Alternatively, in some examples, single user (e.g., administrator) may interact with a combination of the components. For example, a first user may operate both the data controller 104 and the purpose determination setup agent 108. Further still, in some examples, a user (e.g., a user of a service/application provided by the data controller or a client or business partner of the data controller, such as user 125 described in more detail below) may interact with the application 122, for example, using a user device on which the application 122 is running.

In some examples, various components of the system 100 may be active while other components may be used for storage. For example, the purpose agent 102, the rule framework agent 110, the workflow 116, the purpose service agent 114, and the application 122 may include active components, while the data controller storage 103, the purpose definition 106, the purpose determination setup agent 108, rules 112, and assignments 118, 120 may include data storage components. As such, in some examples, the data controller storage 103 comprises a set of stored data relating to a data controller. Further, in some examples, data storage components may be stored on and retrieved from one or more data stores.

In some examples, the application 122 may asynchronously initiate a trigger to the purpose agent 102 through an event mechanism, as will be described in further detail below. Further, in some examples, the purpose agent 102 may request additionally information from the application 122 such as, for example, data related to the data controller, data relating to a predecessor, and inputs for rule determination. In some examples, an additional user 125 may interact with the system 100. The user 125 may operate the application 122, as shown. In some embodiments, the purpose agent 102 may submit one or more data requests to various other components. For example, the purpose agent 102 may be communicatively coupled to each of the purpose service agent 114, the rules framework agent 110, and the workflow 116. Further, the application 122 may submit a request to the purpose agent 102 via an asynchronous event, as described above.

In some examples, at least one of the users 124 or user 125 may be a data subject such that the at least one user's data is managed by the data controller 104. In additional or alternative examples, the data subject may be yet another user which is not shown in FIG. 1. Accordingly, the purpose agent 102 may assign at least one purpose to the data of the data subject to protect the data of the data subject and ensure that the data is only used for the specified purposes. For example, the assigned purpose may restrict access to the data of the data subject such that certain sensitive data is only accessible to certain authorized entities for the specified purposes (e.g., and is not accessible to other, non-authorized entities and/or for other, non-specified purposes). As such, the data controller 104 is only able to share data of the data subject if the sharing is described by the assigned purpose. Further, the data controller 104 itself may be restricted such that the data controller 104 can only process the data of the data subject for specific purposes.

In some examples, the rule framework agent 110 may provide additional rules associated with an assigned purpose. For example, a rule may specify a set of authorized entities which have access to a set of data and/or a document. In some examples, rules may be provided for determining the purpose based on specific parameters/aims of the application 122 and specific content within the set of data and/or document to which a purpose is being assigned. Further, in some examples, the rule framework agent 110 identifies a purpose for a document and/or other data based on a set of policies defined within the system 100. In some examples, documents including data sets may be generated during execution such that purposes may be assigned as data is received or generated.

In some examples, a plurality of applications may be included within the system 100. For example, the purpose agent 102 may provide purpose-based processing and access to a plurality of applications. Accordingly, in some such examples, each application may choose to opt in or out of purpose-based data processing. As such, the applications may opt out of purpose-based processing such that the purpose agent 102 does not disrupt normal operation of the application. Further, since the purpose agent 102 operates asynchronously from the application 122, in some examples, applications may not have to opt out of purpose-based processing. In such examples, the purpose agent 102 may still be triggered but no purpose will be determined. In examples where multiple applications opt into purpose-based data processing, rules, purpose definitions, and/or other parameters for assigning purposes to data and managing data storage and processing according to the purposes may be provided on a per-application or per-client (e.g., client or business partner associated with one or more applications) basis.

In some examples, a machine learning algorithm may be used as part of at least one of the components in the system 100. For example, a machine learning algorithm may be included as part of the purpose agent 102. Accordingly, the machine learning algorithm may be trained to assign a purpose to a set of data. For example, the machine learning algorithm may be trained over time to identify the use of various sets of data and documents. Accordingly, the machine learning algorithm may determine a purpose based on the use. For example, the machine learning algorithm may be trained to identify tax data and assign a tax audit purpose to the tax data. In additional or alternative examples, the machine learning model may be trained by data mining various web resources relating to processing of personal data to determine what types of data are used by various entities for various purposes.

In some examples, various components of the system 100 may include, for example, a processor programmed to perform various operations for carrying out such embodiments. For example, a processor may be included on and/or associated with the purpose agent 102 for assigning a purpose to a set of data, to workflow 116 for processing data according to an assigned purpose, to purpose service agent 114 for building purpose assignments, etc. In some examples, operations may be performed using a user interface (e.g., a graphical user interface) to allow interaction between a user (e.g., the users 124 and/or 125) and an associated component of the system 100 (e.g., application 122, purpose definition 106, purpose determination setup 108, rules 112, etc.) to engage with and/or configure the component. Further, in some examples, various processing steps or operations may be distributed across multiple components are a plurality of different processors. In additional or alternative examples, various components of the system 100 may be duplicated. For example, the system 100 may be adapted to a plurality of data controllers 104 such that the purpose-based processing may be provided to a plurality of different data controller entities.

In some examples, the purpose assignment may be made retroactively on an existing set of data. For example, a data controller 104 may already have a large set of personal data and decide to implement purpose-based processing and data storage. Accordingly, the data controller 104 may provide the data set to the purpose agent 102 which will assign a purpose to the existing data. Alternatively, in some embodiments, purposes may be assigned as new data is created or updated.

First Example Method—Configuring Purposes for Managing Personal Data

Figure 2:
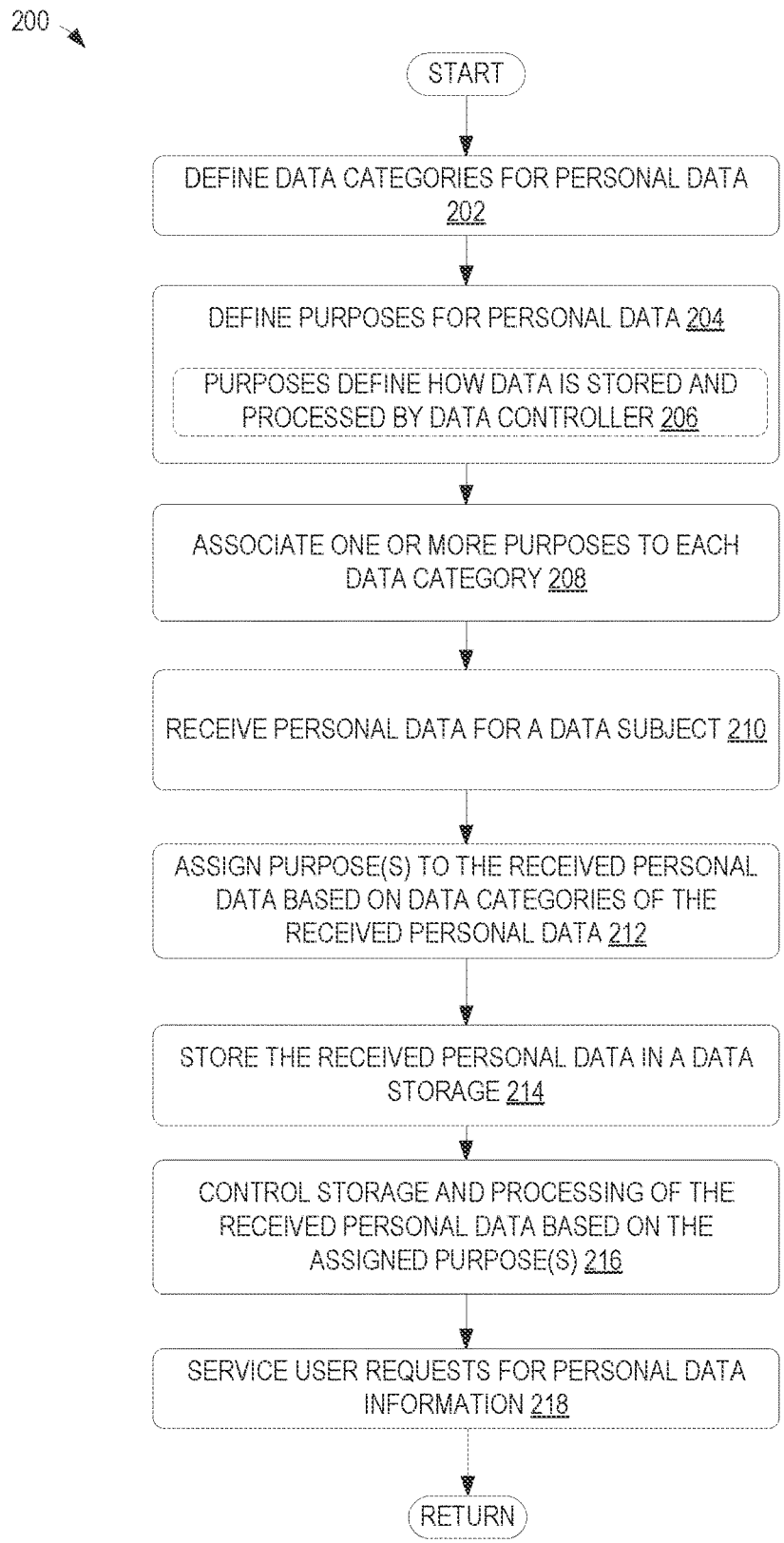
FIG. 2 is a flowchart of an example method for managing personal data in accordance with defined purposes for data storage and processing.

FIG. 2 is a flowchart of an example method 200 for configuring and implementing purpose-based management of personal data. For example, method 200 may be performed by one or more components of a system, such as a system 100 of FIG. 1. At 202, the method includes defining data categories for personal data. For example, an administrator may be authorized to determine different types of data categories for use in separating and organizing personal data. In some examples, the data category definitions may be determined as part of the purpose determination setup 108 and/or the rules 112 of FIG. 1. In other examples, a separate process may be implemented to determine categorizations of personal data.

Figure 3:
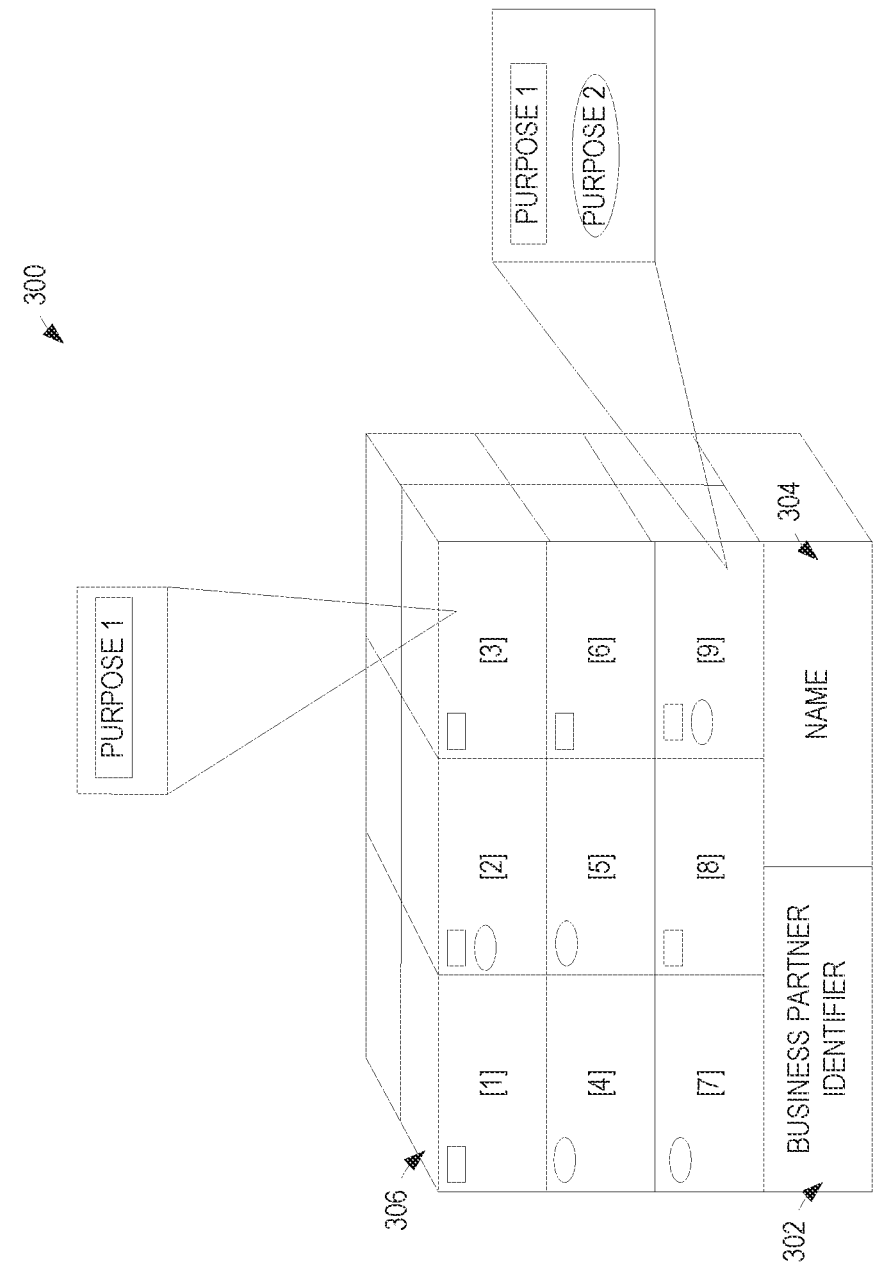
FIG. 3 is a schematic diagram of an example categorization of personal data in accordance with examples of the present disclosure.

Turning briefly to FIG. 3, an example categorization of personal data is schematically depicted by diagram 300. The diagram 300 may represent a structure for a data set corresponding to a selected business partner (e.g., associated with the business partner identifier 302) of a data controller and an individual (e.g., identified by name 304) to which the personal data belongs. Data categories 306 may each represent a different type of personal data that may be stored at the data controller, including but not limited to business address, personal address, communication/contact information, bank account information, gender, civil status information, national identifier, ethnic origin, personal attributes, and/or other information collected by the data controller. For example, the data category may be a set of data attributes that encompass a set of personal data, attributes of the data subject or business object with similar behavior in the sense of usage, meaning, quality, and/or risk in respect of the data subject. The data assigned to a dedicated data category may be intended to be used in at least one processing step as a semantical unit. The definition of data categories may receive field names as metadata, an additional category or type for the category, and a data categorization indicator (e.g., sensitivity level), for example to designated sensitive personal data or business secrets.

Returning to FIG. 2, at 204, the method includes defining purposes for personal data. For example, as indicated at 206, the purposes may define how data is stored and processed by the data controller. For example, the purpose may include the reason and final goal for which a data controller processes personal data in an end-to-end process. The end-to-end process, which is described with the purpose, may be further enhanced with specified, more detailed complementary purposes. Although inextricably linked to the primary purpose, complementary purposes may allow a more granular business process and business-driven differentiation of data protection measures (e.g., access rights, retention- and deletion rules, privacy by design, etc.). The purpose may be related to and/or may dictate where the personal data is processed, what entity is responsible for the personal data, what entity or entities are authorized for accessing and/or processing the personal data, the lifecycle status, including retention periods, of the personal data, the reason the personal data is processed and for what processing the personal data can be used, and/or other attributes/parameters.

At 208, the method includes associated one or more purposes to each data category. In some examples, the purpose(s) for each data category may be communicated to the user associated with the personal data before the personal data is stored and/or responsive to a request by the user for the purpose information. Turning briefly again to FIG. 3, each of the data categories 306 are respectively associated with one or more purposes. For example, a first purpose is represented by a rectangle, and a second purpose is represented by an oval. In the illustrated example, the data category "[9]" is associated with both the first and second purposes, and the data category "[3]" is associated with only the first purpose. As will be described below, the purposes may be used to control how data of each category is managed—e.g., the data in data category "[3]" may be accessed/processed in accordance with the first purpose, etc.

Returning to FIG. 2, at 210, the method includes receiving personal data for a data subject. For example, the data subject may interact with an application associated with the data controller and/or a corresponding business partner, and data corresponding to the data subject and/or the interactions of the data subject with the application may be received at the data controller. At 212, the method includes assigning one or more purposes to the received personal data based on data categories of the received personal data. For example, the received personal data may be separated into different data categories corresponding to those categories defined at 202. The purposes assigned to the different data categories may likewise be associated with the personal data for those data categories respectively. As indicated at 214, the method includes storing the received personal data in a data storage (e.g., data controller storage 103 of FIG. 1). For example, the data may be stored based on the data categories and associated assigned purposes determined at 212.

At 216, the method includes controlling storage and processing of the received personal data based on the assigned purposes. For example, as described in more detail with respect to FIG. 4, requests to access and/or perform operations on the personal data may be selectively allowed or disallowed based on whether the requests adhere to the defined purpose(s) of the relevant data categories of the personal data to which the requests relate. As a brief example, if a purpose for a first data category is to perform a first operation (e.g., transferring the data in the first data category to a selected entity), then a request to perform that first operation on personal data in that data category may be allowed, while a request to perform a second, different operation on personal data in that data category may not be allowed. As another example of controlling storage of the received personal data, the personal data in each data category may be removed/deleted in accordance with a retention policy associated with (e.g., defined for) the respective purpose of the corresponding data category.

At 218, the method includes servicing requests for personal data information. For example, at any time, the data controller may provide a requesting data subject with information regarding the personal data that is stored for the data subject, including what data is stored, the purposes for storing the data, and any logs of operations that have been performed relative to the data (e.g., storing, processing, transferring, etc.). In some examples, the response to the data subject may include an identification of any personal data for the data subject that is stored, organized based on purpose assignments for the different categories of the personal data (e.g., all personal data for the data subject stored in association with a first purpose may be grouped together, all personal data for the data subject stored in association with a second purpose may be grouped together, etc.). In some examples, reports of authorized (or attempts from unauthorized entities) access to the personal data may be reported responsive to the access and/or responsive to operations that are performed on the personal data in order to keep the data subject informed in real-time or near-real-time.

Second Example Method—Controlling Data Access Based on Purposes

Figure 4:
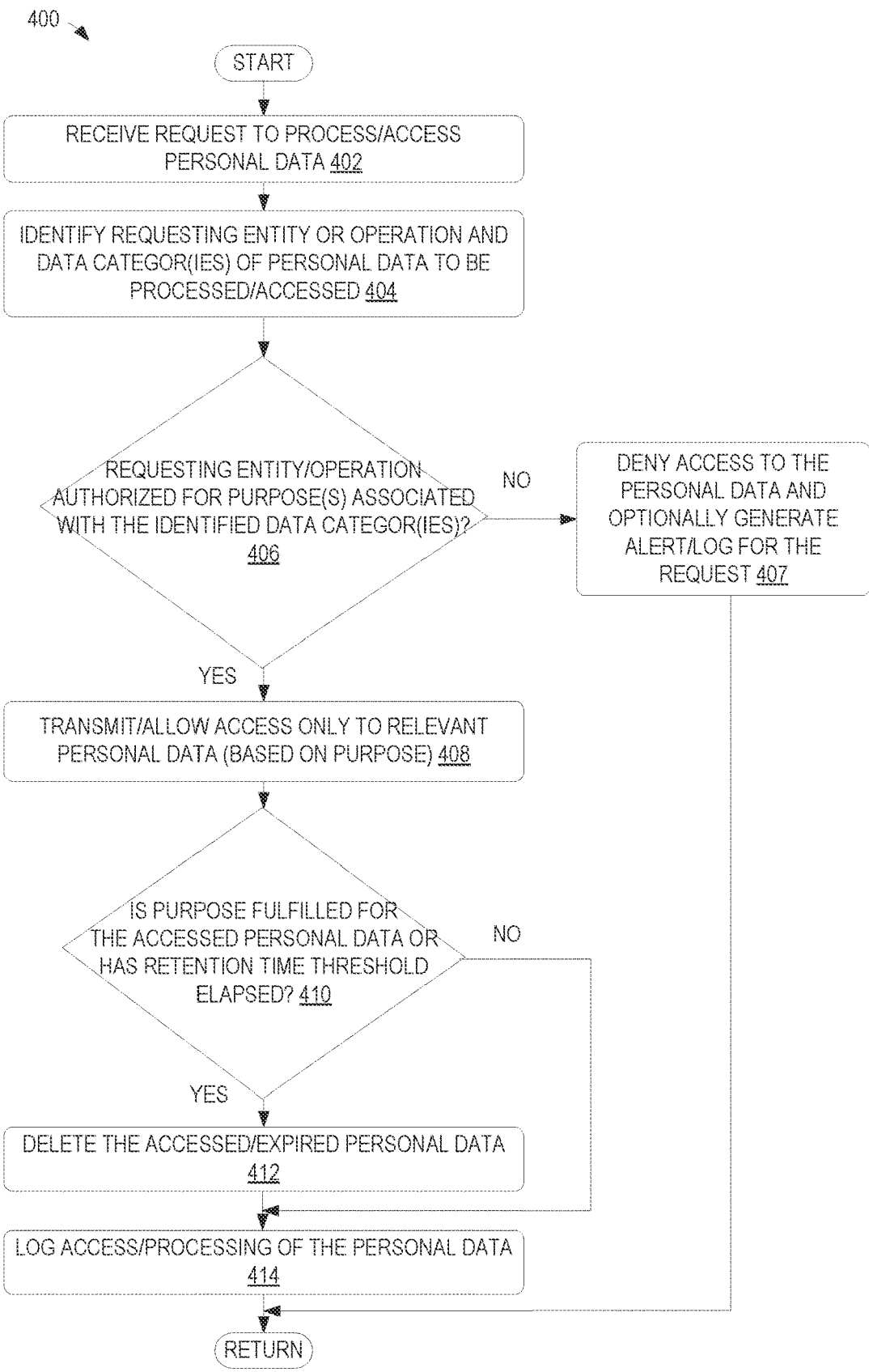
FIG. 4 is a flowchart of an example method for processing data based on defined purposes in accordance with examples of the present disclosure.

FIG. 4 is a flowchart of an example method 400 for illustrating a process sequence of controlling how personal data is accessed and processed in accordance with purpose assignments. For example, method 400 may be performed by one or more components of a system, such as the system 100 of FIG. 1. At 402, the method includes receiving a request to process and/or access personal data stored at the data controller (e.g., in the data controller storage 103 of FIG. 1). The request may be received from another process of the data controller and/or from an external entity requesting to receive, view, process, and/or otherwise interact with the personal data. Accordingly, at 404, the method includes identifying the requesting entity or operation and the data category or categories of personal data to be processed and/or accessed.

At 406, the method includes determining if the requesting entity/operation is authorized for the purpose(s) associated with the identified data category/categories. If the requesting entity/operation is not authorized (e.g., "NO" at 406), the method includes denying access to the personal data and, optionally, generating an alert and/or log for the request to indicate that a non-authorized entity/operation attempted to access the personal data, as indicated at 407. The log may be stored in an event log (e.g., in a data storage system within system 100 in some examples) in association with the personal data and/or the data category to which the personal data is associated. In some examples, if the request corresponds to multiple data categories and the requesting entity is authorized for the purposes associated with a subset of the data categories, then the requesting entity may only be denied access to the data in the data categories for which purposes it is not authorized (and the entity may be allowed to access the data in the other data categories, for which purposes it is authorized). If the requesting/entity operation is authorized (e.g., "YES" at 406), the method includes transmitting and/or allowing access only to the relevant personal data, based on the purpose matching the request and authorization, as indicated at 408.

At 410, the method includes determining if a purpose is fulfilled for the accessed personal data, or if a retention time threshold has elapsed (e.g., the data has "expired") for any of the stored personal data. If "YES" at 410, the method includes deleting the accessed personal data or expired personal data. It is to be understood that the check for the elapsed retention time may be performed on an interrupt basis, where the personal data is deleted once the corresponding retention time threshold has been reached, regardless of whether the personal data associated with that retention time threshold has been accessed/processed. An example of fulfilling a purpose that results in deleting the accessed personal data includes performing an operation or transferring personal data in a data category associated with a purpose that designates a retention only until the operation/transfer is completed. In such an example, the personal data in that data category may be deleted once the operation is performed and/or the data is transferred in accordance with the purpose. As indicated at 414, the method may further include logging access and/or processing of the personal data, which may be used to provide information to a data subject regarding how the personal data is being used and/or to track usage of the personal data to determine when a purpose has been fulfilled.

Example Data Model

Figure 5:
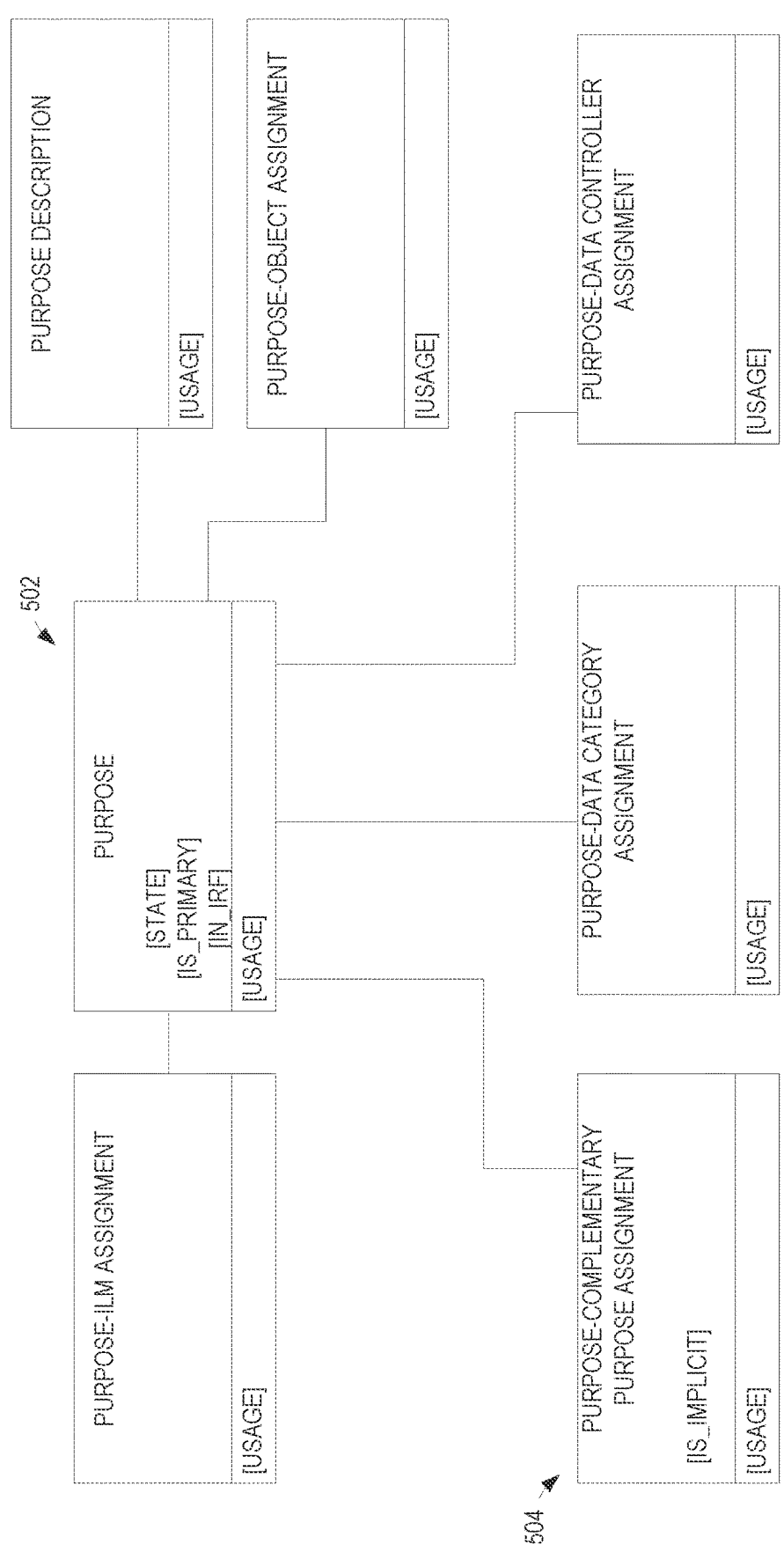
FIG. 5 is a schematic diagram of an example data model for use in purpose-based management of personal data in accordance with examples of the present disclosure.

FIG. 5 shows example diagram of a data model 500 for purposes as used in purpose-based personal data management in accordance with the technologies described herein. For example, the data model 500 may be used to define and associate purposes for personal data in different data categories, as described with respect to FIGS. 1-4 above. It is to be understood that the objects or other data structures in the data model 500 are exemplary, and additional, fewer, and/or different combinations of objects/data structures may be used in a data model for purpose-based storage of personal data without departing from the scope of this disclosure.

As shown in FIG. 5, the data model 500 includes a purpose object 502 for a selected purpose, such as one of the purposes defined by the purpose definitions 106 of FIG. 1 and/or one of the first or second purposes of FIG. 3. Each object in the data model 500 may be understood to include identifying information for the purpose, including a client to which the purpose is associated, a purpose name, etc. In addition, the purpose object 502 may include a purpose state ("[state]") attribute, a designation of whether the purpose is a primary purpose ("[is_primary]"), and a designation of whether the purpose is in an information retrieval framework ("[in_IRF]"). The state may identify whether the purpose is a draft (e.g., a default state), an active state (e.g., in use at a data controller), inactive (e.g., not in use at a data controller), and/or other state designations (e.g., blocked, etc.). In some examples, inactive states may be configured such that no new and/or further assignments may be possible for the purpose. Active purposes may be the only purposes that are returned to a caller via Application Programming Interfaces (APIs) and/or search help interfaces. A purpose object may also include a "use_in_information" flag, which designates whether the purpose is to be used in an information report.

The designation of whether the purpose is a primary purpose may be used to differentiate from complementary purposes. For example, a complementary purpose may only be assigned if the complementary purpose does not have an "[is_primary]" flag set. An example complementary purpose object 504 may also include in some examples an "[is_implicit]" flag, which, when set, implicitly assigns the complementary purpose to a business partner via a manual and/or derived assignment along with a corresponding main purpose. If the "[is_implicit]" flag is not set for a given complementary purpose object, the complementary purpose may only be assigned explicitly by a purpose agent (e.g., purpose agent 102 of FIG. 1).

Other objects in the data model 500 may include an Information Lifecycle Management (ILM) assignment object 506 (e.g., mapping the purpose to an ILM), data category assignment object 508 (e.g., mapping the purpose to one or more data categories), purpose description object 510, (e.g., indicating attributes/parameters of the purpose) object assignment object 512 (e.g., mapping the purpose to one or more objects), and data controller assignment object 514 (e.g., mapping the purpose to one or more data controllers). Each object may include a usage attribute ("[usage]"), which denotes where the associated purpose may be used. For example, the usage may be designated for all usages, as IRF-only usages, consent-only usages, and/or other defined usages.

In some examples, to improve transparency, purpose information may be provided to a data subject. In such examples, the data subject may be a user who the set of data belongs to or is associated with. For example, a data subject may be notified of the specific purposes for which their personal data is accessible. Further, in some examples, the data subject may be able to provide consent for sharing their data or, in some circumstances revoke access to their personal data. Accordingly, data models for purposes having different usages may be created to comply with preferences of a data subject. For example, a data subject may provide biometric data within a set of data and give consent that the biometric data should only be used for facial recognition and should not be shared or used for any other purpose. Accordingly, a consent-based facial recognition purpose may be assigned based on consent given by the data subject.

In some examples, a graphical user interface may be included such that the data subject may review various aspects of the purpose-based access and data storage techniques described herein. For example, the graphical user interface may be generated for display on a user device of a data subject user, such that the data subject can provide consent for data sharing and manage various purposes for their data. In one example, the data subject user may specify one or more specific purposes for which a set of sensitive personal data may be used, for example by providing user input into the graphical user interface. Accordingly, the purpose agent 102 of FIG. 1 may assign purposes to the data based on these user inputs.

In another example, the data subject may specify that a certain portion of their personal data should be accessible for a product suggestion purpose. Accordingly, the name and address of the data subject may be used by the data controller 104 to provide promotional offers and product suggestions, for example, by mailing product offers and sales information to the data subject's address. Further still, in some examples, the data subject's purchase history data may be processed in order to personalize the product offers to the data subject.

Further Implementation Examples

In some examples, to reduce redundancies, an assignment of a data controller to a data subject may be made and stored as a fixed attribute, to separate data of different responsibilities. Automatic data controller assignments for new entries in business partner master data may be derived (e.g., automatically) from information in corresponding master data sets in consideration of the attributes in the data controller configuration. The data controller for a new business partner master data may also be defaulted from a new user parameter or from a role assignment of a user/administrator creating the business partner.

The system depicted in FIG. 1 may provide a configuration to set up a different data controller, with different line organization attributes/tables in the system that currently represent, for different personal data, a legal entity or specific part of a legal entity to the data controller. Based on these assignments, the system may provide mechanisms to persist the assignment of which data controller(s) are responsible for a particular data subject to the corresponding data objects (e.g., master data) in the system, rule framework that derives the data controller out of several aspects used to define an enterprise structure in the system (e.g., a determination of a data controller either out of existing data of a data subject or based on the executed processes in the system), and logic to determine the data controller based on system configurations and to automatically assign the data controller to the master data (e.g., for newly created master data, and/or for already existing master data in the system when activating the data controller or when introducing new data controllers that are also responsible for existing business partner master data in the system). The system may also provide mechanisms for overwriting automated data controller determinations and assignments in master data maintenance views (e.g., of a graphical user interfaces), and manage authorization objects and perform authorization checks to control data access with respect to data controller(s) assigned to master data and assigned to the user/data subject.

The system may include mechanisms for performing end of purpose checks of data controllers and data controller-based blocking and deletion of personal data. For example, if a data subject has ongoing personal data storage with two different data controllers (e.g., data controllers 1 and 2), and data controller 1 fulfills a purpose for the personal data, the personal data for data controller 1 may be deleted by removing the purpose associated with data controller 1 from the data object(s) for the personal data. Using the example schematic of FIG. 3, if the data in category "[9]" has its purpose 1 fulfilled, the corresponding personal data may remain in storage, however, the purpose 1 designation for that data may be removed such that a subsequent request to access the data in accordance with purpose 1 (e.g., without being in accordance with remaining purpose 2) is denied.

Example Advantages

This solution is superior in comparison of approaches in the past with regards to at least the following considerations. Persistency in data controller and purpose assignments across systems and applications increases transparency and reduces resource usage for managing personal data for a data subject. Furthermore, the purpose assignment to data categories reduces the risk of processing data, as the legal ground for processing personal data is provided, the assignment enables retention and deletion policies to be carried out seamlessly, as described above, at end of purpose timeframes, the processing of the data is limited to associated purpose(s) in compliance with some regulations, and sensitive data access may be recorded in relation to the context to provide further enhanced control over data usage. Generally, the solution described herein increases the security of personal data management and the transparency of usage of personal data in diverse systems.

A Generalized Computer Environment

Figure 6:
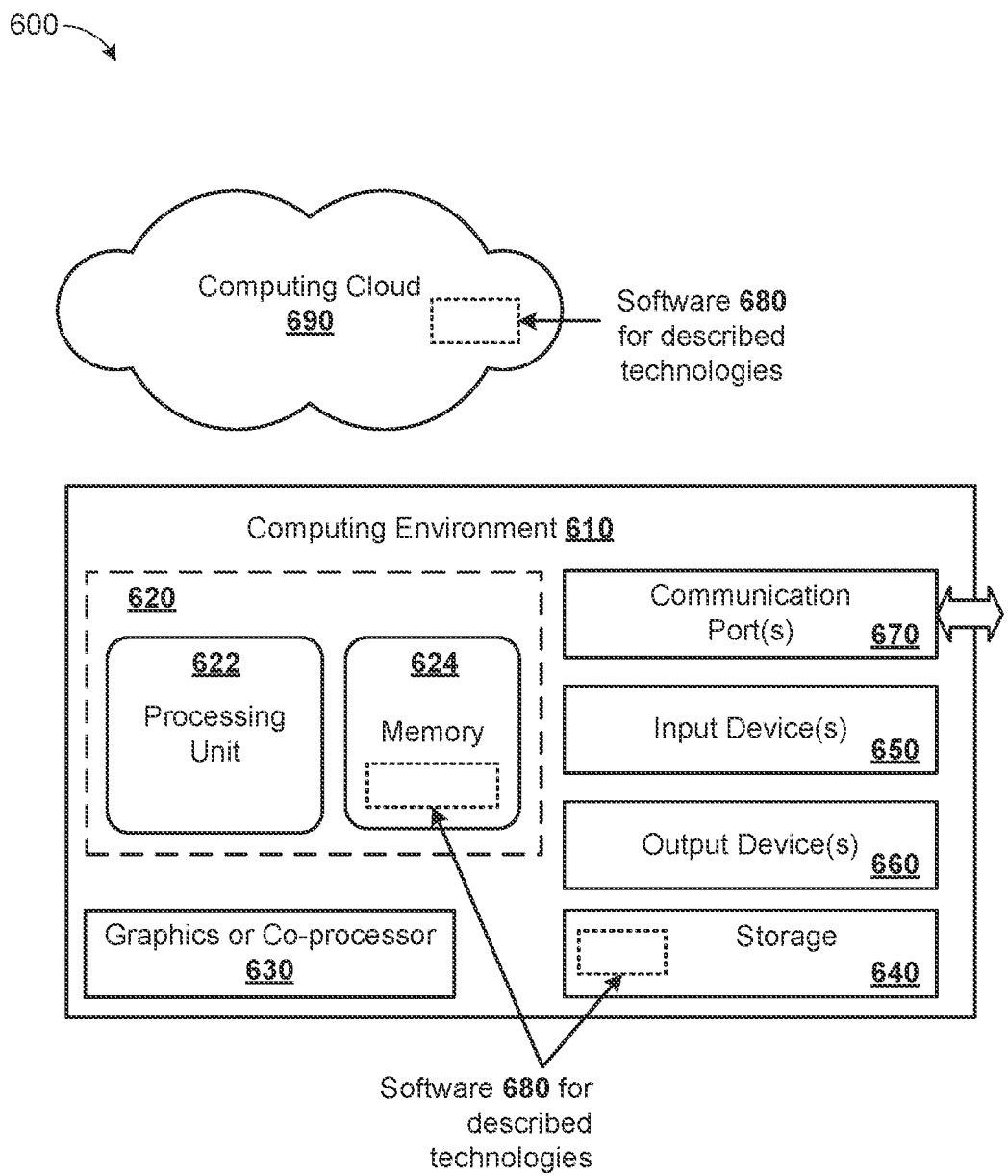
FIG. 6 is a diagram schematically depicting a computing environment suitable for implementation of disclosed technologies.

FIG. 6 illustrates a generalized example of a suitable computing system 600 in which described examples, techniques, and technologies, including calculating sustainability footprints according to disclosed technologies can be implemented. The computing system 600 is not intended to suggest any limitation as to scope of use or functionality of the present disclosure, as the innovations can be implemented in diverse general-purpose or special-purpose computing systems.

With reference to FIG. 6, computing environment 610 includes one or more processing units 622 and memory 624. In FIG. 6, this basic configuration 620 is included within a dashed line. Processing unit 622 executes computer-executable instructions, such as for implementing any of the methods or objects described herein for performing queries on a composite graph data structure representing a dynamic system, or various other architectures, components, handlers, managers, modules, or services described herein. Processing unit 622 can be a general-purpose central processing unit (CPU), a processor in an application-specific integrated circuit (ASIC), or any other type of processor. In a multi-processing system, multiple processing units execute computer-executable instructions to increase processing power. Computing environment 610 can also include a graphics processing unit or co-processing unit 630. Tangible memory 624 can be volatile memory (e.g., registers, cache, or RAM), non-volatile memory (e.g., ROM, EEPROM, or flash memory), or some combination thereof, accessible by processing units 622, 630. The memory 624 stores software 680 implementing one or more innovations described herein, in the form of computer-executable instructions suitable for execution by the processing unit(s) 622, 630. The memory 624 can also store footprint calculation data, a composite graph data structure, including nodes, edges, and their respective attributes; a table or other data structure indicating states of a modeled system, configuration data, UI displays, browser code, data structures including data tables, working tables, change logs, output structures, input fields, output fields, data values, indices, or flags, as well as other operational data.

A computing system 610 can have additional features, such as one or more of storage 640, input devices 650, output devices 660, or communication ports 670. An interconnection mechanism (not shown) such as a bus, controller, or network interconnects the components of the computing environment 610. Typically, operating system software (not shown) provides an operating environment for other software executing in the computing environment 610, and coordinates activities of the components of the computing environment 610.

The tangible storage 640 can be removable or non-removable, and includes magnetic disks, magnetic tapes or cassettes, CD-ROMs, DVDs, or any other medium which can be used to store information in a non-transitory way and which can be accessed within the computing environment 610. The storage 640 stores instructions of the software 680 (including instructions and/or data) implementing one or more innovations described herein.

The input device(s) 650 can be a mechanical, touch-sensing, or proximity-sensing input device such as a keyboard, mouse, pen, touchscreen, trackball, a voice input device, a scanning device, or another device that provides input to the computing environment 610. The output device(s) 660 can be a display, printer, speaker, optical disk writer, or another device that provides output from the computing environment 610.

The communication port(s) 670 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 600 can also include a computing cloud 690 in which instructions implementing all or a portion of the disclosed technology are executed. Any combination of memory 624, storage 640, and computing cloud 690 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 7:
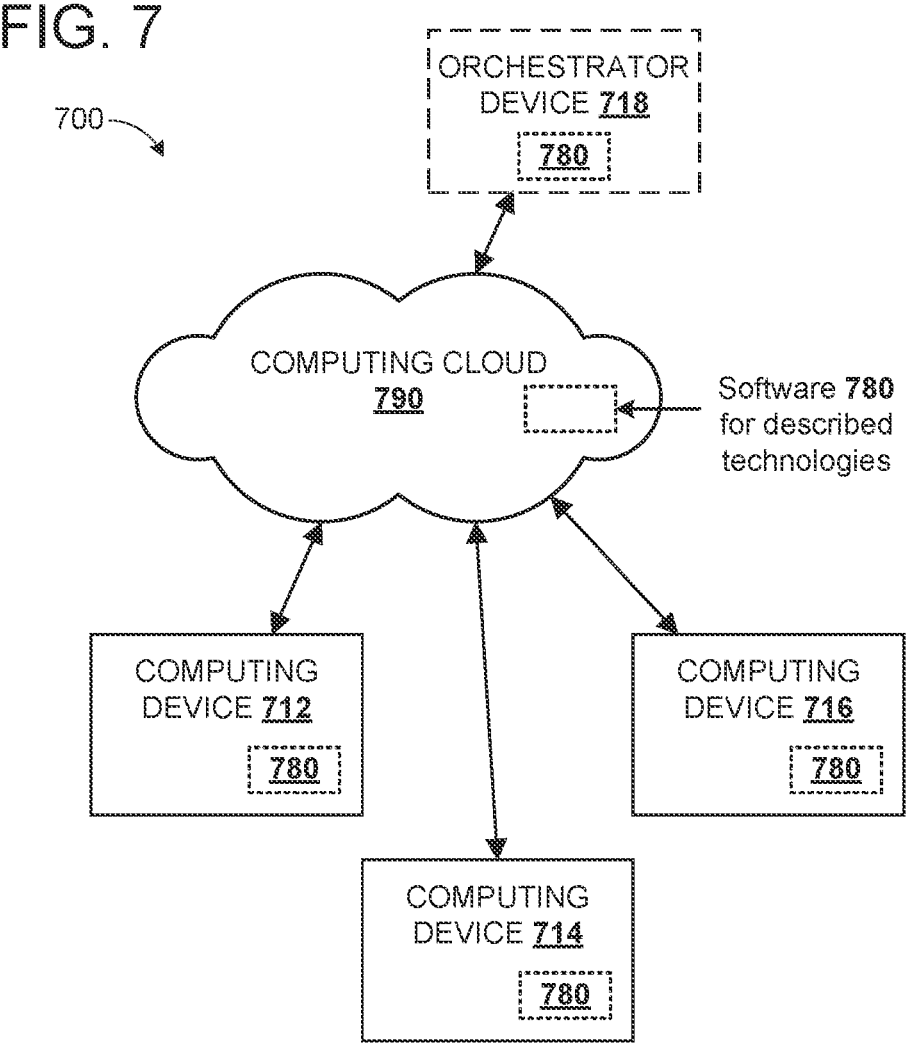
FIG. 7 is a diagram schematically depicting computing devices operating in conjunction with a computing cloud for implementation of disclosed technologies.

FIG. 7 depicts an example cloud computing environment 700 in which the described technologies can be implemented. The cloud computing environment 700 comprises a computing cloud 790 containing resources and providing services. The computing cloud 790 can comprise various types of cloud computing resources, such as computer servers, data storage repositories, networking resources, and so forth. The computing cloud 790 can be centrally located (e.g., provided by a data center of a business or organization) or distributed (e.g., provided by various computing resources located at different locations, such as different data centers and/or located in different cities or countries).

The computing cloud 790 can be operatively connected to various types of computing devices (e.g., client computing devices), such as computing devices 712, 714, and 716, and can provide a range of computing services thereto. One or more of computing devices 712, 714, and 716 can be computers (e.g., servers, virtual machines, embedded systems, desktop, or laptop computers), mobile devices (e.g., tablet computers, smartphones, or wearable appliances), or other types of computing devices. Communication links between computing cloud 790 and computing devices 712, 714, and 716 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 712, 714, and 716 can also be connected to each other.

Computing devices 712, 714, and 716 can utilize the computing cloud 790 to obtain computing services and perform computing operations (e.g., data processing, data storage, and the like). Particularly, software 780 for performing the described innovative technologies can be resident or executed in the computing cloud 790, in computing devices 712, 714, and 716, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 6, computer-readable storage media include memory 624, and storage 640. The term computer-readable storage media does not include signals and carrier waves. In addition, the term computer-readable storage media does not include communication ports (e.g., 670) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C #, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method performed by a computer, the method comprising:
receiving personal data for a data subject corresponding to a first data category;
executing an operation in a purpose agent to associate one or more purposes to the personal data, wherein the one or more purposes are assigned to the first data category and include at least a first purpose for which personal data is to be stored or processed;
storing the personal data in a data storage system, wherein the stored personal data is designated as being associated with the one or more purposes; and
controlling access to the personal data based on the one or more purposes, wherein the method further includes:
associating the personal data with two or more purposes including a first purpose and a second purpose, and revoking access to the personal data in accordance with the first purpose once the first purpose is fulfilled or a retention time threshold associated with the first purpose has elapsed,
determining that the first purpose is fulfilled or the retention time threshold associated with the first purpose has elapsed, wherein, after determining that the first purpose is fulfilled or the retention time threshold associated with the first purpose has elapsed, and after revoking access to the personal data in accordance with the first purpose, the method further comprises determining that the second purpose is fulfilled or a retention time threshold associated with the second purpose has elapsed and, in response, deleting the personal data.

2. The method of claim 1, wherein controlling access to the personal data comprises, prior to revoking access to the personal data, allowing a first entity to access and perform, on the personal data, an operation that is allowed by the first purpose responsive to determining that the first entity is an authorized entity under the first purpose.

3. The method of claim 2, further comprising logging the access or the performance of the operation on the personal data in an event log.

4. The method of claim 3, further comprising reporting the event log associated with the personal data to the data subject responsive to performing the logging or responsive to a request from the data subject.

5. The method of claim 1, wherein controlling access to the personal data comprises, prior to revoking access to the personal data, denying a first entity to access and perform, on the personal data, an operation responsive to determining that the first entity is not an authorized entity under the first purpose or that the operation is not permitted by the first purpose.

6. The method of claim 1, wherein in the second condition, the personal data is only associated with the first purpose and not with any other purpose.

7. The method of claim 1, wherein revoking access to the personal data in accordance with the first purpose comprises removing the first purpose from association with the personal data while the personal data remains stored in the data storage system, and wherein a subsequent request to access the personal data in accordance with the first purpose is denied after removing the first purpose from association with the personal data.

8. A system, comprising:
one or more hardware processors with memory coupled thereto;
computer-readable media storing instructions executable by the one or more hardware processors, the instructions comprising:
first instructions to receive personal data for a data subject corresponding to a first data category;
second instructions to execute an operation in a purpose agent to associate one or more purposes to the personal data, wherein the one or more purposes are assigned to the first data category and include a first purpose and a second purpose for which personal data is to be stored or processed;
third instructions to store the personal data in a data storage system, wherein the stored personal data is designated as being associated with the first purpose and the second purpose; and
fourth instructions to control access to the personal data based on the first purpose and the second purpose, wherein the instructions further include:
fifth instructions to determine that the first purpose is fulfilled or a retention time threshold associated with the first purpose has elapsed and, in response, revoke access to the personal data in accordance with the first purpose by removing the first purpose from association with the personal data, wherein the personal data remains stored in the data storage system after removing the first purpose from association with the personal data.

9. The system of claim 8, wherein, after revoking access to the personal data in accordance with the first purpose, the personal data is associated with the second purpose, and the instructions further comprise sixth instructions to delete the personal data after the second purpose is fulfilled or a retention time threshold associated with the second purpose has elapsed.

10. The system of claim 8, wherein controlling access to the personal data comprises, prior to revoking access to the personal data, allowing a first entity to access and perform, on the personal data, an operation that is allowed by the first purpose responsive to determining that the first entity is an authorized entity under the first purpose.

11. The system of claim 10, wherein the instructions further comprise sixth instructions to log the access or the performance of the operation on the personal data in an event log.

12. The system of claim 11, wherein the instructions further comprise seventh instructions to report the event log associated with the personal data to the data subject responsive to performing the logging or responsive to a request from the data subject.

* * * * *